US007226629B2

(12) United States Patent
Smith et al.

(10) Patent No.: US 7,226,629 B2
(45) Date of Patent: *Jun. 5, 2007

(54) MICROWAVEABLE GRILLED CHEESE AND MEAT SANDWICHES AND METHOD OF PREPARATION

(75) Inventors: Gary F. Smith, Highland Park, IL (US); Maria E. Almendarez, Chicago, IL (US); Glenn A. MacBlane, Chicago, IL (US); Jimbay Loh, Green Oaks, IL (US); Timothy S. Hansen, LaGrange, IL (US); Laura L. Herbst, Buffalo Grove, IL (US); Kent H. Thrasher, Sun Prairie, WI (US); Anilkumar G. Gaonkar, Buffalo Grove, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,394

(22) Filed: Feb. 24, 2003

(65) Prior Publication Data
US 2004/0166204 A1 Aug. 26, 2004

(51) Int. Cl.
*A21D 13/00* (2006.01)
*A23G 9/00* (2006.01)
*A23G 9/007* (2006.01)
*A23G 9/013* (2006.01)

(52) U.S. Cl. .............................. 426/89; 426/92; 426/99; 426/275; 426/302

(58) Field of Classification Search .................. 426/89, 426/273, 289, 291, 293, 302, 310, 654, 417, 426/442, 92, 99, 275
See application file for complete search history.

(56) References Cited

U.S. PATENT DOCUMENTS

| | | | |
|---|---|---|---|
| 2,521,219 A | 9/1950 | Holman et al. | |
| 3,293,043 A | 12/1966 | Matz et al. | |
| 3,526,515 A | 9/1970 | Werbin et al. | |
| 3,696,514 A | 10/1972 | McIntyre et al. | |
| 3,965,323 A | 6/1976 | Forker, Jr. et al. | |
| 3,997,674 A | 12/1976 | Ukai et al. | |
| 4,157,403 A | 6/1979 | Schiffmann et al. | |
| 4,293,572 A | 10/1981 | Silva et al. | |
| 4,401,681 A | 8/1983 | Dahle | |
| 4,448,791 A | 5/1984 | Fulde et al. | |
| 4,472,440 A | 9/1984 | Bank | |
| 4,504,502 A | 3/1985 | Earle et al. | |
| 4,603,051 A | 7/1986 | Rubenstein et al. | |
| 4,661,359 A | 4/1987 | Seaborne et al. | |
| 4,671,963 A | 6/1987 | Germino et al. | |
| 4,710,228 A | 12/1987 | Seaborne et al. | |
| 4,721,622 A | 1/1988 | Kingham et al. | |
| 4,810,534 A | 3/1989 | Seaborne et al. | |
| 4,847,098 A | 7/1989 | Langler | |
| 4,880,646 A | 11/1989 | Lew et al. | |
| 4,915,971 A | 4/1990 | Fennema et al. | |
| 4,960,600 A | 10/1990 | Kester et al. | |
| 4,999,208 A | 3/1991 | Lengerich et al. | |
| 5,035,904 A | 7/1991 | Huang et al. | |
| 5,089,278 A | 2/1992 | Haynes et al. | |
| 5,130,150 A | 7/1992 | Averbach | |
| 5,130,151 A | 7/1992 | Averbach | |
| 5,147,670 A * | 9/1992 | Cebula et al. ................ 426/98 |
| 5,248,512 A | 9/1993 | Berberat et al. | |
| 5,376,388 A | 12/1994 | Meyers | |
| 5,401,518 A | 3/1995 | Adams et al. | |
| 5,409,715 A | 4/1995 | Meyers | |
| 5,409,717 A | 4/1995 | Apicella et al. | |
| 5,433,960 A | 7/1995 | Meyers | |
| 5,472,724 A | 12/1995 | Williams et al. | |
| 5,518,744 A | 5/1996 | Kaeser et al. | |
| 5,520,942 A * | 5/1996 | Sauer et al. ................. 426/289 |
| 5,543,164 A | 8/1996 | Krochta et al. | |
| 5,573,793 A | 11/1996 | Saintain | |
| 5,705,207 A | 1/1998 | Cook et al. | |
| 5,736,178 A | 4/1998 | Cook et al. | |
| 5,753,286 A | 5/1998 | Higgins | |
| 5,756,140 A | 5/1998 | Shoop et al. | |
| 5,789,008 A | 8/1998 | Monte | |

(Continued)

FOREIGN PATENT DOCUMENTS

| | | |
|---|---|---|
| EP | 0421510 | 4/1991 |
| EP | 0509566 | 10/1992 |
| EP | 1080642 | 3/2001 |
| EP | 1080643 | 3/2001 |
| EP | 1142494 | 10/2001 |
| EP | 1247460 | 10/2002 |
| JP | A 60224445 | 11/1985 |
| JP | 63146750 | 6/1988 |

(Continued)

OTHER PUBLICATIONS

Lange's Handbook of Chemistry (15th Edition). McGraw Hill (1999). Knovel Database (published online Mar. 2, 2001) [retrieved from internet Aug. 17, 2004] Table 3.2 URL <http://www.knovel.com/knovel2/Toc.jsp?SpaceID=145&BookID=47>.*
Donhowe et al., "Water Vapor and Oxygen Permeability of Wax Films" *JAOCS*, vol. 70, No. 9, Sep. 1993.
Hogenmaker et al., "Edible Costings from Morpholine-Free Wax Microemulsions", *J. Agric. Food Chem.* 45, 349-352, 1997.
Greener et al., "Barrier Properties and Surface Characteristics of Edible, Bilayer Films", *Journal of Food Science*, vol. 54, No. 6, 1989.

(Continued)

*Primary Examiner*—Arthur L. Corbin
(74) *Attorney, Agent, or Firm*—Fitch, Even, Tabin & Flannery

(57) ABSTRACT

The present invention is directed to microwaveable grilled cheese and grilled cheese and meat sandwiches that include an edible, lipid based moisture barrier. The edible moisture barrier includes an edible microparticulated high melting lipid and an edible low melting triglyceride blend.

34 Claims, 3 Drawing Sheets

U.S. PATENT DOCUMENTS

| | | | |
|---|---|---|---|
| 5,795,603 | A | 8/1998 | Burger |
| 5,885,617 | A | 3/1999 | Jordan |
| 5,891,495 | A | 4/1999 | Cain et al. |
| 5,928,692 | A * | 7/1999 | Mayfield ............... 426/89 |
| 5,939,114 | A | 8/1999 | Cain et al. |
| 6,038,542 | A | 3/2000 | Ruckdashel |
| 6,039,988 | A | 3/2000 | Monte |
| 6,066,347 | A | 5/2000 | Prasad et al. |
| 6,110,515 | A | 8/2000 | Clechet et al. |
| 6,139,885 | A | 10/2000 | Jouanneau et al. |
| 6,146,672 | A | 11/2000 | Gonzalez et al. |
| 6,177,112 | B1 | 1/2001 | Dufort et al. |
| 6,461,654 | B1 | 10/2002 | Cain et al. |
| 6,472,006 | B1 | 10/2002 | Loh et al. |
| 6,500,474 | B2 | 12/2002 | Cross et al. |
| 6,503,546 | B1 | 1/2003 | Ferrari-Philippe et al. |
| 2003/0008037 | A1 | 1/2003 | Valenzky, Jr. et al. |
| 2003/0008038 | A1 | 1/2003 | Valenzky, Jr. et al. |
| 2003/0077356 | A1 | 4/2003 | Campbell et al. |

FOREIGN PATENT DOCUMENTS

| | | |
|---|---|---|
| WO | WO 92/01394 | 2/1992 |
| WO | WO 97/15198 | 5/1997 |
| WO | WO 99/51102 | 10/1999 |
| WO | WO 01/97625 | 12/2001 |
| WO | WO 03/007736 | 1/2003 |
| WO | WO 03039852 | 5/2003 |

OTHER PUBLICATIONS

Kester et al., "The Influence of Polymorphic Form on Oxygen and Water Vapor Transmission through Lipid Films", *JAOCS*, vol. 66, No. 8, Aug. 1989.

Kester et al., "Resistance of Lipid Films to Water Vapor Transmission", *JAOCS*, vol. 66, No. 8, Aug. 1989.

Landmann et al., "Permeability of Some Pac Products to Moisture", *The Journal of the American Oil Chemists' Society*, vol. 37, Jan. 1960.

Lovegren et al., "Permeability of Acetostemin Products to Water Vapor", *Agricultural and Food Chemistry*, vol. 2, No. 11, May 26, 1954.

Martin-Polo et al., "Hydrophobic Films and Their Efficiency Against Moisture Transfer.2. Influence of the Physical State", *J. Agric. Food Chem.*, vol. 40, No. 3, 1992.

Kamper et al., Water Vapor Permeability of Edible Bilayer Films, *Journal of Food Science*, vol. 49, 1984.

Greener et al., Evaulation of Edible, Bilayer Films for Use as Moisture Barriers for Food, *Journal of Food Science*, vol. 54, No. 6, 1989.

Kamper et al., Use of Edible Film to Maintain Water Vapor Gradients in Foods, *Journal of Food Science*, vol. 50, 1985.

Kester et al., "An Edible Film of Lipids and Cellulose Ethers Barrier Properties to Moisture Vapor Transmission and Structural Evaluation", *Journal of Food Science*, vol. 54, No. 6, 1989.

Kamper et al, Water Vapor Permeability of an Edible, Fatty Acid, Bilayer Film, *Journal of Food Science*, vol. 49, 1984.

Morillem et al., "Factors Affecting the Moisture Permeability of Lipid-Based Edible Films A Review", *Critical Reviews in Food Science and Nutrition*, 42(1):67-89, 2002.

Rhodes et al., "Costings for Controlled-Release Drug Delivery Systems", *Drug Development and Industrial Pharmacy*, 24(12), 1139-1154, 1998.

Shukla, "What's a Plastics Extruder Doing in the Food Business?", *Cereal Foods World*, vol. 41, No. 8, Aug. 1996.

Chen, "Functional Properties and Applications of Edible Films Made of Milk Proteins", *J. Diary Sci*, 78:2563-2583, 1995.

Kester et al., "An Edible Film of Lipids and Cellulose Ethers: Performance in a Model Frozen-Food System", *Journal of Food Science*, vol. 54, No. 6, 1989.

Koelsch et al., "Functional, Physical, and Morphological Properties of Methyl Cellulose and Fatty Acid-Based Edible Barriers", *Icbenam.-Wiss.u.-Technol.*, vol. 25, 1992.

Lange's Handbook of Chemistry (15th Edition), McGraw Hill (1999). Knovel Database (published online Mar. 2, 2001) [retrieved from Internet on Aug. 17, 2004] Table 3.2 URL http://www.knovel.com/knovel2/Toc.jsp?SpaceID-1458xBookIT)-47.

The Edible Oils Co. First published online Jul. 1, 2003 [retrieved from Internet Sep. 14, 2004] URL.http://edible.net/hydrogenated_soybean_oil_spec.htm.

EP Search Report, EP 04250728, 2004, 4 pages.

Robinson, "Building a Better Cheese", *Food R or D*, Dairy Field's Ingredient Technology Section. vol. 181(4), pp. 39-41, 1998.

Hui, "Edible Oil and Fat Products: Products and Application Technology", *Wiley-Interscience*.

* cited by examiner

MICROWAVEABLE GRILLED CHEESE AND MEAT SANDWICHES AND METHOD OF PREPARATION

The present invention relates to a microwaveable grilled cheese and microwaveable grilled cheese and meat sandwiches that include an edible, lipid-based, moisture barrier. More particularly, the edible moisture barrier is useful in preventing moisture migration between the cheese and/or meat and the bread. Hence, the microwaveable grilled cheese and grilled cheese and meat sandwiches may be stored with refrigeration, be heated and still provide acceptable organoleptic properties without the moisture barrier being detectable by a consumer.

BACKGROUND

For many food products, especially prepackaged sandwiches, moisture levels must be maintained if the product is to exhibit optimum organoleptic properties, quality, and taste. Moisture migration in finished food products can seriously compromise quality, stability, and organoleptic properties. In addition, many chemical and enzymatic deteriorative reactions proceed at rates partially governed by the moisture content of foods. Excessive rates of these reactions can promote deleterious changes in the flavor, color, texture, and nutritive value of food products.

In multi-component food products, particularly those having components with different moisture contents and water activities such as prepackaged grilled cheese sandwiches, moisture can migrate between adjacent components, altering the component's characteristics and organoleptic properties. In addition to compromising the quality of finished food products, moisture migration can hinder production and distribution of food products. Thus, for example, the cheese in the sandwich may dry out while, at the same time, the texture of the bread may change with time, especially becoming soft and/or soggy.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier film's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as oils, fats, and waxes, are composed of lipophilic water insoluble molecules capable of forming a water impervious structure, they have been investigated for use in moisture barrier films. With respect to oleaginous materials derived from lipids (i.e., sucrose polyesters, acetylated monoglycerides and the like) and/or other film forming lipids, it has been shown that, unless an undesirably thick coating is used, the barrier is not sufficiently effective for food products requiring long shelf life. Such film forming lipids tend to become unstable under normal, practical use condition and lose film integrity and barrier effectiveness. In addition to structural instability, such as oiling out or cracking upon handling or with changes in temperatures, such lipid-based moisture barriers have disadvantages of being organoleptically unacceptable (greasy or waxy mouthfeel).

Accordingly, many of the barriers in the art use a water-impermeable lipid in association with hydrocolloids or polysaccharides such as alginate, pectin, carrageenan, cellulose derivatives, starch, starch hydrolysates, and/or gelatin to form gel structures or crosslinked semi-rigid matrixes to entrap and/or immobilize the nonaqueous or lipid material. In many cases these components are formed as bilayer films. These bilayer films may be precast and applied to a food surface as a self-supporting film with the lipid layer oriented toward the component with highest water activity. See, for example, U.S. Pat. No. 4,671,963 (Jun. 9, 1987), U.S. Pat. No. 4,880,646 (Nov. 14, 1987), U.S. Pat. No. 4,915,971 (Apr. 10, 1990), and U.S. Pat. No. 5,130,151 (Jul. 14, 1992). There are, however, a number of drawbacks associated with these moisture barriers. The hydrocolloids themselves are hydrophilic and/or water soluble and thus tend to absorb water with time. The absorption of water by the hydrophilic material in moisture barrier is greatly accelerated while the film is directly in contact with foods having a water activity ($A_w$) above 0.75. In addition, some hydrocolloids tend to make the barriers fairly stiff, requiring the addition of a hydrophilic plasticizer (e.g., polyol) to increase flexibility. These plasticizers are often strong moisture binder themselves thus promoting moisture migration into the barriers and decreased structural stability and effectiveness of the barriers. Furthermore, the texture and the required thickness of some of these barriers may make their presence perceptible and objectionable when the product is consumed. Additional processing steps (casting and drying) required to form these films make them difficult to use in high speed commercial production.

In the case of prepackaged grilled cheese sandwiches, a fat barrier is typically applied to the side of the bread facing the cheese, as described in U.S. Pat. No. 6,139,885. Moisture from the cheese can be transmitted through the air around the barrier to other parts of the bread, rendering the bread soggy. Even if sealing the part of the toast in contact with the cheese were sufficient to prevent moisture migration, the bread/toast has many nooks and crannies, making effective sealing of the surface for the purpose of moisture barrier extremely difficult under refrigerated conditions without an extremely thick coating of the barrier material. Thick coatings tend to be unpalatable to most consumers.

A particular type of barrier as described in U.S. Pat. No. 6,139,885 yields a more static layer that tends to remain in place to a greater extent after the cheese has melted. Hence, this type of barrier is more noticeable to the consumer. Application of the barrier to the toast results in a product that has a more noticeable barrier since the cheese does not flow next to it.

SUMMARY

The present invention is directed to microwaveable grilled cheese sandwiches and microwaveable grilled cheese and meat sandwiches that provide acceptable organoleptic properties after preparation, storage under refrigeration, and subsequent reheating. The sandwiches include an edible moisture barrier that is completely coated around the cheese and/or cheese and meat and which is not detectable when eaten by the consumer. This edible moisture barrier is highly effective in preventing moisture migration between the cheese and/or cheese and meat and the bread at a given storage temperature.

Sandwiches of the invention may be heated and consumed or eaten cold. The edible moisture barrier of this invention is formed from a composition comprising an edible triglyceride blend having a melting point of about 35° C. or lower and an edible microparticulated high melting lipid having a melting point of about 60° C. or higher. In an important aspect of the invention, the edible microparticulated high melting lipid has a volume average particle size of 10 microns or less to provide an adequate amount of lipid particles with a particle size of 0.1 microns or less. This composition has unique thermomechanical properties that makes it ideal as an edible moisture barrier in grilled cheese products.

In an important aspect of the invention, the moisture barrier composition is effective for providing a barrier where solid fat content (SFC) does not change more than 5% with +5° C. to –5° C. of the storage temperature of the food product. Changes of greater than 5%, could compromise the effectiveness of the barrier. In a very important aspect of the invention, SFC of the barrier at the storage temperature of the product is 30 to 70%, preferably SFC is 55 to 70% and most preferably, SFC is 60 to 65% at the storage temperature (5° C.) of the product. The moisture barrier is further made organoleptically desirable for providing a change in SFC of at least 20% at temperature from 20° C. to 37° C. and a SFC of less than 35% at a temperature above 37° C. These characteristics provide a moisture barrier with a good, rapid and clean melt, and a non-waxy mouthfeel.

Typically, the moisture barrier composition contains 65 to 99 weight percent of the edible, low melting triglyceride blend and 1 to 35 weight percent of the edible, microparticulated high melting lipid; preferably, the composition contains 75 to 95 weight percent of the edible, low melting triglyceride blend and 5 to 25 weight percent of the edible, high melting lipid; and most preferably the composition contains 85 to 92 weight percent of the edible, low melting triglyceride blend and 8 to 15 weight percent of the edible, high melting lipid. In an important aspect of the invention, the edible microparticulated, high-melting lipid is calcium stearate and the low melting triglyceride blend is palm kernel oil and canola oil.

The present invention also provides an edible moisture barrier and a method for preventing moisture migration between cheese and bread and/or cheese and meat and bread in sandwiches. In this aspect of the invention, the moisture barrier is particularly effective for use in multicomponent foods with at least one component having an $A_w$ of greater than 0.75. The edible moisture barrier of the invention has a low moisture permeability and is easy to manufacture and use with grilled cheese and/or cheese and meat products. The edible moisture barrier of the invention is specially formulated for intended storage temperature of the food product and is effective for covering a food surface completely and providing a barrier that is sufficiently strong, stable and non-brittle to form a surface that will resist cracking during handling and storage (either at refrigeration or ambient temperatures), but is easily penetrated during consumption. The edible barrier of the invention has organoleptic properties of taste, aftertaste, and mouthfeel that are essentially imperceptible such that the consumer is unaware of the presence of the barrier when the product is consumed. The moisture barrier of the invention is effective for reducing moisture migration between bread and cheese by maintaining a water activity difference of at least 0.01 and preferably at least 0.02 over the course of 16–24 weeks, as compared to a grilled cheese sandwich where no moisture barrier is present where the water activities are essentially the same. The moisture barrier of the invention is further effective for increasing refrigerated shelf life of a grilled cheese sandwich containing the moisture barrier by at least 16 times and more preferably by at least 24 times as compared to food product where no moisture barrier is present. This generally translates into a refrigerated shelf life for a grilled cheese sandwich of 6 months or longer.

The present invention also provides a method for reducing moisture migration between bread and cheese and/or bread, cheese and meat sandwiches. In this aspect of the invention, the edible moisture barrier is brought into contact with the cheese, meat or cheese and meat in an amount effective for reducing moisture migration between the cheese and/or meat and bread. In an important aspect, all surfaces of the cheese or the outer surface of the cheese/meat combination are completely coated with the moisture barrier. Generally, the edible moisture barrier is applied to form an essentially continuous barrier layer at least 20 microns thick, preferably 100 microns to 1 mm thick, and more preferably 200 to 500 microns thick.

DETAILED DESCRIPTION

Figure 1:
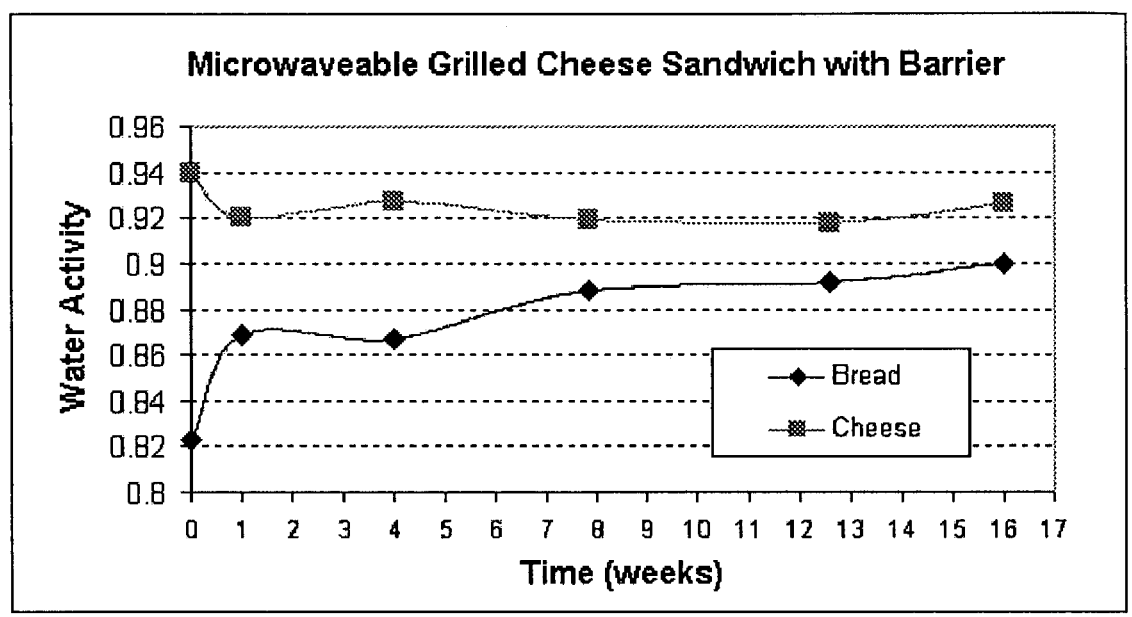
FIG. 1 shows a change in water activity in a grilled cheese product that does not include a moisture barrier. The product was made as per the Example herein. No moisture barrier was applied around the cheese in this example.
Figure 2:
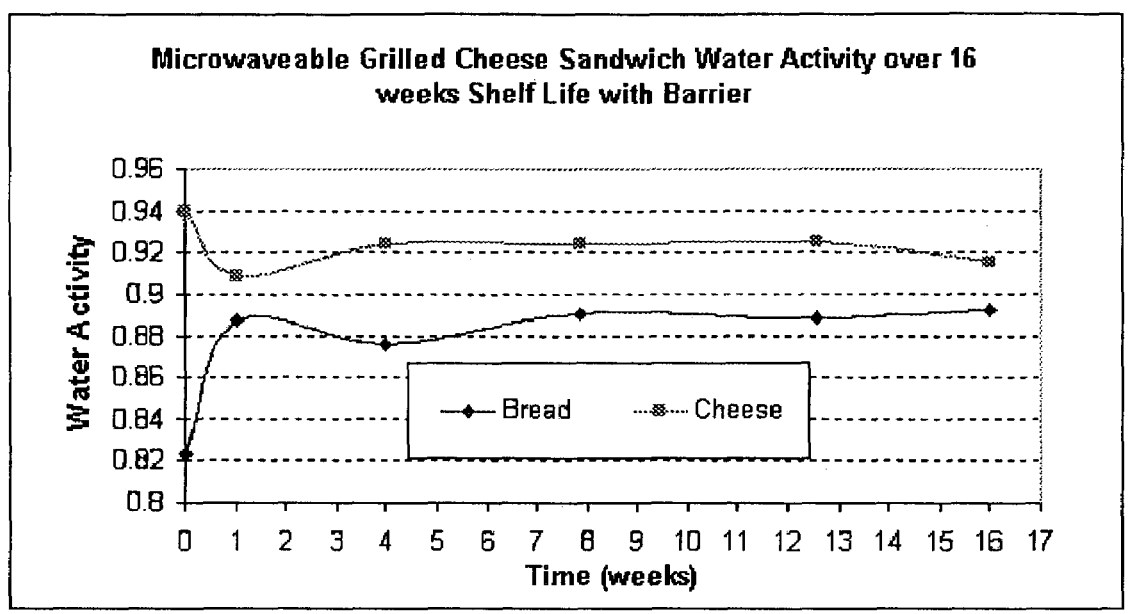
FIG. 2 illustrates a change in water activity in a grilled cheese product including one moisture barrier of the invention.
Figure 3:
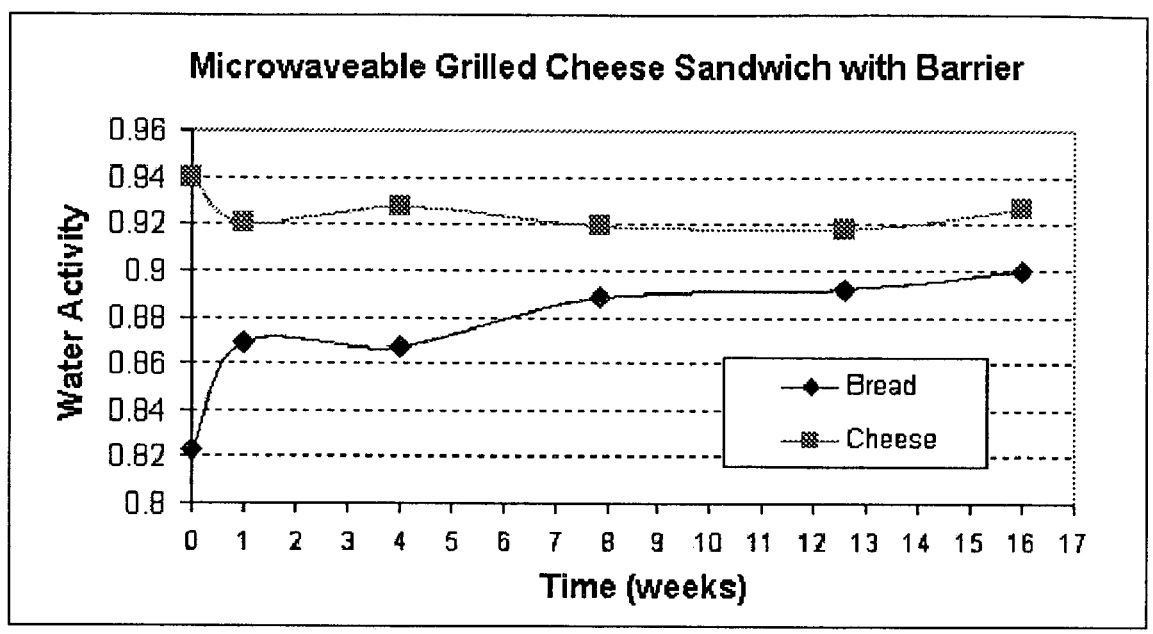
FIG. 3 shows a change in water activity in a grilled cheese product including one moisture barrier of the invention. The product was made as per the Example herein.

A microwavable grilled cheese sandwich or cheese and meat sandwich is provided with an edible moisture barrier. The edible moisture barrier of the present invention has organoleptic properties of taste, aftertaste, and mouthfeel that are imperceptible such that the consumer is unaware of the presence of the barrier when the product is consumed. The moisture barrier is self-supported which eliminates the need for a base polymer network/film, thus eliminating the need of casting, coating or drying with a polymeric base layer and resulting undesirable textured defects, such as hardness or chewiness. Indeed, the edible moisture barrier of the present invention is rapid and clean melting, is free from residues, and has a creamy (i.e., smooth), non-waxy mouthfeel.

Additionally, the edible moisture barrier composition of the present invention possesses a stable network structure supported by numerous, fine crystalline fat particles which resist the tendency to recrystallize, bloom or crack and provides good stability at targeted storage temperature of the food product. The specific fat/oil ratio defined by SFC is tailored and maintained for actual storage temperatures. This stable, fine fat crystal network also helps to immobilize liquid oil fraction in the barrier. Overall, this provides a stable, water resistant, nonporous lipid layer resulting in a more effective barrier and a more stable fat matrix, such that cracking occurring during cooling and storage may be minimized. Specific SFC is also designed for rapid melting at body temperatures to impart a pleasant or nondetectable mouthfeel and for ease of application by, for example, spraying, brushing or enrobing.

Definitions

Unless defined otherwise, all technical and scientific terms used herein have the same meaning as commonly understood by one of ordinary skill in the art to which this invention belongs. All patents and publications referred to herein are incorporated by reference herein. For purposes of the present invention, the following terms are defined below.

As used herein, "edible material" includes any material that is generally regarded as safe by FDA and does not have to be removed from the food component before it is eaten (i.e., a material that can be safely chewed and ingested by the consumer).

As used herein, "barrier" or "moisture barrier" is understood to describe a thin continuous structure or layer that is essentially impermeable to moisture migration through it, and which coats an inner or outer surface of a food product. The barrier may be described as a coating, film, or membrane. The barrier can be placed between components having differing water activities within the food product to prevent or significantly reduce moisture migration between the components or on the outer surface of the food product to prevent or significantly reduce moisture migration between the food product and the ambient environment. The moisture barrier of this intention is designed to be used in direct contact with moist foods and to be effective against moisture migration through vapor equilibrium and/or liquid diffusion. For purposes of this invention, in the case of preventing moisture migration between the food product and the ambient environment, the first food component would be considered to be one or more outer surfaces of the food product and the second food component would be considered to be the ambient environment.

As used herein, "water activity" ($A_w$) is the ratio of vapor pressure of water in the food of interest and vapor pressure of pure water at the same temperature. As used herein "lipid" refers to any of a group of substance that in general are soluble in or miscible with ether, chloroform, or other organic solvents for fats and oils (technically, triglycerides of fatty acids, short for triglycerides) but are practically insoluble in water. Lipids may be classified as simple lipids, compound lipids or derived lipids.

Simple lipids include esters of fatty acids with alcohols. Fats and oils are esters of fatty acids with glycerol, and waxes are esters of fatty acids with alcohols other than glycerol.

Compound lipids include phospholipids, cerebrosides or glycolipids, and others, such as sphigolipids, and carotenoids.

Derived lipids include substances derived from natural lipids (simple or compound) and include fatty acids, fatty alcohols and sterols, hydrocarbons and emulsifiers (artificially derived, surface active lipids).

"Fat/Oil ratio" or "solid fat content (SFC)" is commonly used to describe the rheology and phase composition of lipids. Fat is solid at a given temperature, whereas oil is liquid. The fat/oil of a given lipid is not a constant but a function of temperature. For example, butter can be regarded as mainly solid fat (~70% fat) at 0° C. and becomes plastic (~15% fat) at room temperature and completely liquid oil (0% fat) above 40° C. Therefore, it is possible to tailor a blend of triglycerides that has any fat/oil ratio at a given temperature(s) except for having a high fat/oil ratio at a very high temperature. When a lipid-based fat crystal control agent is used in the composition, such agent itself is also often lipid, hence, the actual SFC of a barrier must include the fat and oil fractions from the fat crystal control agent. Fat/oil ratio in a barrier varies with temperature and is important to barrier effectiveness and stability at actual storage temperature (e.g. 5° C. for refrigerated storage) of food product. It is also an important aspect of this invention that barrier composition alone without considering its exact SFC profile can not provide superior barrier effectiveness. In other words, an effective barrier composition at ambient temperature will likely fail at refrigeration temperature and vice versa if its SFC changes significantly between 20 and 5 C. The fat/oil ratio is also important for mouthfeel/sensory acceptability at 25 to 37° C., and is important for ease of application at the temperature (typically >40° C.) for transport or application (for example, spraying).

"Barrier effectiveness" was evaluated analytically by a cheese-cup method. A control was prepared by using a water impermeable plastic cup packed with Kraft Velveeta brand process cheese (Aw=0.94) and placed in a constant humidity chamber over saturated magnesium chloride solution with an equilibrium relative humidity of about 33% at refrigeration temperature (about 5 C+/−1 C for all examples). Moisture or weight loss is monitored over a 21-day period as a reference point for the comparison of barrier effectiveness. Too short of a storage time often gives unreliable results that can not be extrapolated to longer term (for example 4 months) storage performance. Similarly prepared cheese-cups coated with selected barrier composition with a thickness of about 300 microns were compared to control under identical condition in terms of "% moisture loss" verse storage time. Average of at least 4 replicates are required and used for comparison purpose. This method simulates more closely the actual product application condition in which the barrier is in direct contact with a moist food component.

As used herein "meat" refers to any type of deli meat. In a very important aspect, the deli meat is ham.

Microparticulated High Melting Lipid

The moisture barrier of the present invention includes microparticulated high melting lipid having a melting point of 60° C. or higher. The microparticulated, high-melting lipid is effective for promoting the formation of small, fat crystals (from triglyceride blend during cooling) that effectively immobilize remaining liquid oil fraction of the triglyceride blend thus preventing liquid oil from draining from the fat crystal network. During subsequent storage, a microparticulated fat crystal control agent is also effective in stabilizing the three dimensional solid fat crystal network made of numerous small fat crystals. Presence of smaller fat crystals provides a better moisture barrier.

Preferred edible, high melting lipids have melting points of about 70° C. or higher, and more preferably about 100° C. or higher. For purposes of this invention, the term "edible, high melting lipids" includes edible long chain fatty acids, their monoglycerides, diglycerides, and triglycerides, their alkaline metal salts, and other derivatives thereof. Other natural or synthetic, food-approved, high melting lipids or lipid-like substances such as fatty alcohol (wax), paraffin and sucrose polyesters can also be used. Generally, the edible, high melting lipids are formed from long chain fatty acids having at least about 16 carbon atoms and preferably about 18 to about 24 carbon atoms; preferably, the long chain fatty acids are saturated. Suitable saturated long chain fatty acids used to form the edible, high melting lipids include, for example, palmitic, stearic acid, arachidic acid, behenic acid, lignoceric acid, and the like; their derivatives, including, for example, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, high melting phospholipids and the like, as well as mixtures thereof.

In an important aspect of the invention, the high melting lipid is microparticulated. Any conventional micromilling equipment can be used to provide the microparticulated high melting fat. Suitable micromilling equipment includes, for example, ball mills, colloid mills, fluid energy mills, pin/disk mills, hammer mills, and the like. The edible high melting lipid is micromilled at a temperature of 40 to 70° C., preferably 45 to 60° C. The micromilling is effective for providing numerous fragments with a particle size of 0.1 microns or less which are believed to be the functional component responsible for fat crystal control and stabilization. In such microparticulated high melting lipid, the volume average particle size as measured by a Horiba LA-900 laser particle sizer (Horiba Instrument, Inc. Irvine, Calif.) is about 10 microns or less preferably 1 to 5 microns. Generally, the particle size is preferably measured at 20° C. by dispersing microparticulated high melting lipid in soybean oil using a sonicator prior to measurement.

In a very important aspect of the invention, the microparticulated high melting fat is micromilled calcium stearate. Micromilled calcium stearate is stable, as it has a melting point of about 145° C., is water insoluble, is an approved GRAS food ingredient, and has a reasonable cost.

Low Melting Triglyceride Blend

The edible moisture barrier of the invention includes an edible low melting lipid blend having a melting point of 35° C. or lower and having a SFC at targeted storage temperature of the food product of 50 to 70%, preferably 55 to 70% and most preferably 60 to 65%. For practical purpose, the low melting lipid preferably comprises a blend of triglycerides of fatty acids including natural, (fully or partially) hydrogenated and/or fractionated edible fats and oils and is referred to "edible, low melting triglyceride blend" hereof. Modified or synthetic lipids such as acetylated mongluceride and paraffin oil may also be used, but less preferred. Suitable edible, low melting triglyceride blend generally include a blend of one or more hydrogenated or non-hydrogenated oils having the desired SFC profile. Suitable edible, low melting triglycerides include oxidatively stable, natural, or hydrogenated and/or fractionated vegetable oils or animal fats including, for example, coconut oil, rapeseed oil, soybean oil, palm oil, palm kernel oil, sunflower oil, corn oil, canola oil, cottonseed oil, peanut oil, cocoa butter, anhydrous milkfat, lard, beef fat, and the like, as well as mixtures thereof. Preferred edible, low melting triglycerides should be stable against oxidation or hydrolysis and may include canola oil, palm oil, palm kernel oil, coconut oil, partially hydrogenated soybean oil and mixtures thereof. Selection of low melting triglyceride blend is critical to meet the SFC specifications of this invention to ensure superior barrier effectiveness, desirable mouthfeel characteristics and acceptable handling properties of the final barrier composition. For example, the SFC of the barrier composition of this invention is also design to be no more than 35% at a temperature above 37° C., preferably less than 20%. In addition, the difference in SFC between 20° C. and 37° C. of the barrier composition is set at least 20%, and preferably more than 30%.

Application of Moisture Barrier

Moisture barrier was first heated to about 40 to 50° C. at which nearly all the fats from low melting triglyceride blend are melted, whereas the microparticulated, high melting lipid is not physically altered or melted. Where inhibition of moisture migration between adjacent portions of a food product having different water activities is desired, the moisture barrier composition can be applied to the contacting surface of one (or both) portions and allowed to cool to below 20° C., before the portions are brought together. The moisture barrier composition will have a viscosity of 20 to 2000 cps at a temperature of from 40° C. to 50° C. Where inhibition of moisture migration between a food product and the ambient environment is desired, the moisture barrier composition can be applied to one or more of the outer or external surfaces of the food product and allowed to cool. In the aspect of the invention where the sandwich is ham and cheese, the barrier may be applied to external surfaces which contact or face the bread of the sandwich.

In an important aspect of the invention, desirable particle sizes can be obtained without controlled cooling rates due to the use of microparticulated high melting lipid. This is an unexpected advantage over the use of other types of fat crystal control agents such as high melting waxes and emulsifiers by first melting such fat crystal control agents in triglyceride blend. Conventional fat crystal control or seeding agents may be used if a proper type of non-microparticulated fat crystal control agent and controlled cooling rate are used.

In one practice of the invention, the barrier is applied by immersing the food product, or simply the surface thereof to be coated, into a melted or molten moisture barrier composition, removing the food product, and allowing the coated product to cool. In another practice of the invention, the molten film is applied by brushing or otherwise applying the composition to the desired surface(s) of the product. Suitable techniques include, for example, dipping, pan coating, and use of a fluidized bed. In still another practice of the invention, the film can be applied using a spray, including atomized spray, air-brushing, and the like. Generally, the edible moisture barrier is applied to the food component to form an essentially continuous barrier layer at least 20 microns thick, preferably 100 microns to 1 mm thick, and more preferably 200 to 500 microns thick.

The following examples illustrate methods for carrying out the invention and should be understood to be illustrative of, but not limiting upon, the scope of the invention which is defined in the appended claims.

EXAMPLES

Example 1

1. Bread was toasted to dark, golden brown.
2. A melted anhydrous milkfat (Level Valley Creamery, Inc., West Bend, Wis.) was brushed onto the exterior of the toast, including the crust with a pastry brush.
3. Two Deli-Deluxe (Kraft) process cheesed slices (¾ ounce per slice) were used per sandwich. They were pressed together to form essentially a single slice of cheese twice as thick as usual.
4. Moisture barrier was applied to all outside surfaces of the doubled up cheese slices by spraying.
5. Coated cheese slices were placed between two slices of toasted bread.
6. Controls were made with cheese that was not coated with a moisture barrier.
7. All sandwiches where placed in impermeable foil pouches and refrigerated.
8. After four, eight, twelve, etc. weeks, sandwiches were removed from the refrigerator for evaluation. While still chilled, approximately one half-inch of the sandwich, including bread and cheese, as measured from an outside edge would be cut off. The barrier was, removed from the cheese and the water activity of the cheese alone was measured using a standard calibrated water activity measurement device. So likewise was the water activity of the toast measured and these were recorded. Concurrently, the rest of the sandwich was placed inside a paper sleeve with susceptor lining and microwaved for approximately 40 seconds. The sandwich was allowed to rest for 1 minute, cut and evaluated by internal panel.

water activity of bread (not toasted)=0.944
water activity of bread toasted=0.834 water activity of bread with AHBF=0.823
AHBF is anhydrous butter fat

16 Week Internal Panel Evaluation

Control: After microwaving, the control sandwich was soggy and mushy. The cheese did not flow after heating, having lost much of its moisture previously.

Sandwiches with Barrier: After microwaving, the toast was light and crisp. The cheese flowed well to the edges of the sandwich. This product resembled a homemade grilled cheese sandwich made on the griddle.

TABLE 1

Water activity of bread over 112 days (16 weeks).

| Time (days) | Control | Myvacet/ AHBF | Myvacet/ AHBF/Emulsifier |
|---|---|---|---|
| 8 | 0.917 | 0.887 | 0.869 |
| 28 | 0.913 | 0.876 | 0.867 |
| 55 | 0.913 | 0.890 | 0.888 |
| 88 | 0.920 | 0.888 | 0.892 |
| 112 | 0.902 | 0.892 | 0.900 |

Water activity of cheese = 0.94

TABLE 2

Water activity of cheese over 112 days (16 weeks).

| Time (days) | Control | Myvacet/ AHBF | Myvacet/ AHBF/Emulsifier |
|---|---|---|---|
| 8 | 0.916 | 0.909 | 0.920 |
| 28 | 0.915 | 0.924 | 0.927 |
| 55 | 0.911 | 0.924 | 0.919 |
| 88 | 0.917 | 0.925 | 0.918 |
| 112 | 0.900 | 0.915 | 0.926 |

Myvacet is an acetylated monoglyceride obtained from Quest.

Example 2

Meat and cheese sandwiches were made by spray-coating both sides of 2 cheese slices. The coating (Partially Hydrogenated Coconut Palm Kernel Oil, Canola Oil, and Polyglycerol Ester) was sprayed on at a rate of approximately 2 grams per side. Three meat slices were then placed between the barrier coated cheese slices. The edges of the meat and cheese component were then sealed with the barrier coating and placed between two slices of bread.

TABLE 3

| Meat | Cheese | Barrier | Bread |
|---|---|---|---|
| OM Smoked Ham | Kraft Deli Deluxe Pasteurized Process Cheese | Yes | Pepperidge Farm White |
| OM Smoked Ham | Kraft Deli Deluxe Pasteurized Process Cheese | No | Pepperidge Farm White |
| OM Smoked Ham | None | Yes | Pepperidge Farm White |
| OM White Smoked Turkey | Kraft Singles Swiss Pasteurized Process Cheese Food | Yes | Pepperidge Farm White |
| OM White Smoked Turkey | Kraft Singles Swiss Pasteurized Process Cheese Food | No | Pepperidge Farm White |
| OM White Smoked Turkey | None | Yes | Pepperidge Farm White |

OM is Oscar Mayer

Results After 16 and 51 Days Were as Follows:

| Meat | Cheese | Barrier | 16 day Evaluation | 51 day Evaluation |
|---|---|---|---|---|
| OM Smoked Ham | Kraft Deli Deluxe Pasteurized Process Cheese | Yes | Little to no moisture into the bread. Meat texture and flavor were normal. Cheese texture and flavor were normal. Components had distinct flavors. | Little to no moisture migration even with cracks in the moisture barrier. Meat and cheese texture was similar to 16 day old product. |
| OM Smoked Ham | Kraft Deli Deluxe Pasteurized Process Cheese | No | Significant moisture migration was observed. Ham texture was tough and dry. Cheese texture was like cheese spread. The different components had a continuous similar flavor. | Bread stuck to the cheese. Ham and cheese collapsed. Sandwich was not as tall as a barrier sandwich product. Cheese was very soft. Ham was dark, dry and tough. Water droplets inside foil pouch. |
| OM Smoked Ham | None | Yes | Moisture migration was observed to be slight and in the places where the barrier wasn't intact. Significantly less migration when compared to "no barrier". | Did not evaluate. |
| OM White Smoked Turkey | Kraft Singles Swiss Pasteurized Process Cheese Food | Yes | Similar to OM Smoked Ham with Kraft Deli Deluxe Pasteurized Process Cheese with barrier. | Similar to OM Smoked Ham with Kraft Deli Deluxe Pasteurized Process Cheese with barrier. |

-continued

| Meat | Cheese | Barrier | 16 day Evaluation | 51 day Evaluation |
|---|---|---|---|---|
| OM White Smoked Turkey | Kraft Singles Swiss Pasteurized Process Cheese Food | No | Similar to OM Smoked Ham without barrier with Kraft Deli Deluxe Pasteurized Process Cheese without barrier. | Similar to OM Smoked Ham with Kraft Deli Deluxe Pasteurized Process Cheese without barrier. |
| OM White Smoked Turkey | None | Yes | Similar to OM Smoked Ham with barrier. | Did not evaluate. |

16 Day Evaluation

Overall, there was a significant decrease in moisture migration in samples made with the moisture barrier. The ham without the barrier has lost a significant amount of moisture and was dry, dark and tough. Product made with the barrier had no off flavors at 16 days.

The ham sandwich made with the barrier was also evaluated after microwaving for 30 seconds on high. After microwaving, the barrier melted. When the hot sandwich was evaluated it was preferred over the cold version (i.e. better/more flavor).

51 Day Evaluation

There was little moisture migration in the product made with the barrier. Meat and cheese texture was similar to 16-day-old product.

In the control product, the bread stuck to the cheese. The ham and cheese inside the sandwich seemed to collapse making the sandwich shorter than the barrier product. The cheese was very soft and watery and the ham was dark, dry and tough. Water droplets were noticed inside the foil pouch of the control.

What is claimed is:

1. A microwaveable grilled cheese sandwich comprising toasted bread and cheese, the cheese being coated on all of its surfaces with an edible moisture barrier,
the edible moisture barrier composition comprising from 1 to 35 weight percent of an edible microparticulated high melting lipid having a melting point of 60° C. or higher and a volume average particle size of less than 10 microns; and from 65 to 99 weight percent of an edible low melting triglyceride blend having a melting point of 35° C. or less, the moisture barrier composition having a solid fat content of 30 to 70 weight percent at a storage temperature of 5 C and a solid fat content of less than 25 weight percent above 37° C. wherein the solid fat content does not change more than 5 weight percent at a storage temperature of 0–10° C., and the moisture barrier composition having sufficient lipid particles with a particle size of not more than 0.1 micron effective to prevent liquid oil in the moisture barrier composition from draining from a fat crystal network formed in the moisture barrier composition.

2. The microwaveable grilled cheese sandwich of claim 1, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

3. The microwaveable grilled cheese sandwich of claim 2, wherein the barrier composition comprises from 5 to 25 weight percent of an edible microparticulated high melting lipid having a melting point of 100° C. or higher and a volume average particle size of less than 5 microns, and from 75 to 95 weight percent of an edible low melting triglyceride blend.

4. The microwaveable grilled cheese sandwich of claim 3, wherein the edible moisture barrier is 20 microns to 1 mm thick.

5. The microwaveable grilled cheese sandwich of claim 1, wherein the edible microparticulated high melting lipid is selected from the group consisting of stearic acid, arachidic acid, behenic acid, lignoceric acid, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

6. The microwaveable grilled cheese sandwich of claim 1, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

7. The microwaveable grilled cheese sandwich of claim 1, wherein the moisture barrier composition comprises from 5 to 25 weight percent of an edible microparticulated high melting lipid having a melting point of 100° C. or higher and a volume average particle size of less than 5 microns, and from 75 to 95 weight percent of an edible low melting triglyceride blend.

8. The microwaveable grilled cheese sandwich of claim 7, wherein the edible microparticulated high melting lipid is calcium stearate.

9. The microwaveable grilled cheese sandwich of claim 1, wherein the moisture barrier composition comprises from 8 to 15 weight percent of an edible microparticulated high melting lipid having a melting point of 100° C. or higher and a volume average particle size of 5 microns or less, and from 85 to 92 weight percent of an edible low melting triglyceride blend.

10. The microwaveable grilled cheese sandwich of claim 1, wherein the edible moisture barrier is 20 microns to 1 mm thick.

11. The microwaveable grilled cheese sandwich of claim 10, wherein the edible moisture barrier is 200 to 500 microns thick.

12. A microwaveable grilled cheese sandwich comprising toasted bread, cheese and an edible moisture barrier composition comprising an edible microparticulated high melting lipid having a melting point of 60° C. or higher and an edible low melting triglyceride blend, the moisture barrier composition being effective for maintaining a water activity difference between the cheese and the toasted bread, the edible moisture barrier composition comprising from 1 to 35 weight percent of the edible microparticulated high melting lipid, the edible microparticulated high melting lipid having a volume average particle size of less than 10 microns; and from 65 to 99 weight percent of the edible low melting triglyceride blend having a melting point of 35° C. or less, the moisture barrier composition having a solid fat content of 60 to 65 weight percent at a storage temperature of 5° C., the moisture barrier composition having a solid fat content of less than 25 weight percent above 37° C. wherein the solid fat content does not change more than 5 weight percent at a storage temperature of 0°–10° C., and the moisture barrier composition having sufficient lipid particles with a particle size of not more than 0.1 micron effective to prevent liquid oil in the moisture barrier composition from draining from a fat crystal network formed in the moisture barrier composition.

13. The microwaveable grilled cheese sandwich of claim 12, wherein the edible microparticulated high melting lipid is selected from the group consisting of stearic acid, arachidic acid, behenic acid, lignoceric acid, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

14. The microwaveable grilled cheese sandwich of claim 12, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

15. The microwaveable grilled cheese sandwich of claim 14, wherein the edible microparticulated high melting lipid is selected from the group consisting of stearic acid, arachidic acid, behenic acid, lignoceric acid, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

16. The microwaveable grilled cheese sandwich of claim 13, wherein the edible microparticulated high melting lipid is calcium stearate.

17. The microwaveable grilled cheese sandwich of claim 12, wherein the edible moisture barrier is 20 microns to 1 mm thick.

18. A method for reducing moisture migration between cheese and bread and between cheese and meat and bread comprising applying an edible moisture barrier composition to all surfaces of a cheese slice or to all external surfaces of a cheese and meat combination, wherein the edible moisture barrier composition comprises an edible microparticulated high melting lipid having a melting point of 60° C. or higher and a volume average particle size of less than 10 microns; and from about 65 to about 99 weight percent of an edible low melting triglyceride blend having a melting point of 35° C. or less, the moisture barrier composition having a solid fat content of 30 to 70 weight percent at a storage temperature of 5° C. and a solid fat content of less than 25 weight percent above 37° C. wherein the solid fat content does not change more than 5 weight percent at a storage temperature of 0°–10° C., the moisture barrier composition having sufficient lipid particles with a particle size of not more than 0.1 micron effective to prevent liquid oil in the moisture barrier composition from draining from a fat crystal network formed in the moisture barrier composition, and wherein the moisture barrier composition is effective for maintaining a water activity difference between the bread and cheese of at least about 0.01 over a storage period of about 24 weeks.

19. The method of claim 18, wherein the edible microparticulated high melting lipid is selected from the group consisting of stearic acid, arachidic acid, behenic acid, lignoceric acid, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, and mixtures thereof.

20. The method of claim 18, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

21. The method of claim 20, wherein the edible microparticulated high melting lipid is selected from the group consisting of stearic acid, arachidic acid, behenic acid, lignoceric acid, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, and mixtures thereof.

22. The method of claim 19, wherein the edible microparticulated high melting lipid is calcium stearate.

23. A microwaveable grilled cheese and meat sandwich comprising toasted bread, meat and cheese, the cheese and meat being completely coated on all external surfaces with an edible moisture barrier of at least 20 microns thick, the edible moisture barrier composition comprising from 1 to 35 weight percent of an edible microparticulated high melting lipid having a melting point of 60° C. or higher and a volume average particle size of from about 1 to about 5 microns; and from 65 to 99 weight percent of an edible low melting triglyceride blend having a melting point of 35° C. or lower, the moisture barrier composition having a solid fat content of 30 to 70 weight percent at a storage temperature of 5° C., and a solid fat content less than 25 weight percent above 37° C. wherein the solid fat content does not change more than 5 weight percent between 0°–10° C., the moisture barrier composition having sufficient lipid particles with a particle size of not more than 0.1 micron effective to prevent liquid oil in the moisture barrier composition from draining from a fat crystal network formed in the moisture barrier composition.

24. The microwaveable grilled cheese and meat sandwich of claim 23, wherein the moisture barrier composition has a solid fat content of from 20 to 80 weight percent at a storage temperature of 5° C.

25. The microwaveable grilled cheese and meat sandwich of claim 23, wherein the moisture barrier composition has a solid fat content of less than 25 weight percent above 37° C.

26. The microwaveable grilled cheese and meat sandwich of claim 23, wherein the moisture barrier composition has a solid fat content that changes at least 20 weight percent over a temperature range between 20° C. and 37° C.

27. The microwaveable grilled cheese and meat sandwich of claim 23, wherein the edible microparticulated high melting lipid is selected from the group consisting of stearic acid, arachidic acid, behenic acid, lignoceric acid, polyglycerol ester, diglycerol monostearate, polyglycerol ester, diglycerol monostearate, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

28. The microwaveable grilled cheese and meat sandwich of claim 27, wherein the edible microparticulated high melting lipid is calcium stearate.

29. The microwaveable grilled cheese and meat sandwich of claim 23, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

30. The microwaveable grilled cheese and meat sandwich of claim 23, wherein the moisture barrier composition comprises from 5 to 25 weight percent of an edible microparticulated high melting lipid having a melting point of 100° C. or higher and a volume average particle size of less than 5 microns, and from 75 to 95 weight percent of an edible low melting triglyceride blend.

31. The microwaveable grilled cheese and meat sandwich of claim 23, wherein the moisture barrier composition comprises from 8 to 15 weight percent of an edible microparticulated high melting lipid having a melting point of 100° C. or higher and a volume average particle size of 5 microns or less, and from 85 to 92 weight percent of an edible low melting triglyceride blend.

32. The microwaveable grilled cheese and meat sandwich of claim 23, wherein the edible moisture barrier is 20 microns to 1 mm thick.

33. The microwaveable grilled cheese and meat sandwich of claim 32, wherein the edible moisture barrier is 200 to 500 microns thick.

34. The microwaveable grilled cheese and meat sandwich of claim 23, wherein the meat is ham.

* * * * *